(12) United States Patent
Nevalainen

(10) Patent No.: US 10,713,205 B2
(45) Date of Patent: Jul. 14, 2020

(54) UNIVERSAL SERIAL BUS (USB) DISCONNECTION SWITCH SYSTEM, COMPUTER PROGRAM PRODUCT, AND METHOD

(71) Applicant: DIGITAL 14 LLC, Abu Dhabi (AE)

(72) Inventor: Jouni Tapio Nevalainen, Li (FI)

(73) Assignee: DIGITAL 14 LLC, Abu Dhabi (AE)

( * ) Notice: Subject to any disclaimer, the term of this patent is extended or adjusted under 35 U.S.C. 154(b) by 0 days.

(21) Appl. No.: 15/898,021

(22) Filed: Feb. 15, 2018

(65) Prior Publication Data
US 2018/0246839 A1 Aug. 30, 2018

Related U.S. Application Data

(60) Provisional application No. 62/463,504, filed on Feb. 24, 2017.

(51) Int. Cl.
*G06F 9/4401* (2018.01)
*G06F 13/40* (2006.01)
*G06F 13/42* (2006.01)
*G06F 21/85* (2013.01)
*G06F 13/20* (2006.01)

(52) U.S. Cl.
CPC .......... *G06F 13/4086* (2013.01); *G06F 13/20* (2013.01); *G06F 13/4295* (2013.01); *G06F 21/85* (2013.01); *G06F 2213/0042* (2013.01); *G06F 2213/3812* (2013.01)

(58) Field of Classification Search
CPC ... G06F 13/4086; G06F 13/4295; G06F 21/85
USPC .......................................................... 710/36
See application file for complete search history.

(56) References Cited

U.S. PATENT DOCUMENTS

| 4,631,534 | A | * | 12/1986 | Franklin | H04L 12/56 370/400 |
| 5,952,632 | A | * | 9/1999 | Irvine | H05K 3/222 200/16 E |
| 6,073,193 | A | * | 6/2000 | Yap | G06F 11/0757 710/100 |
| 6,101,076 | A | * | 8/2000 | Tsai | G06F 11/0745 361/115 |

(Continued)

OTHER PUBLICATIONS

International Search Report and Written Opinion from International Application No. PCT/IB2018/051164, dated May 25, 2018.

(Continued)

*Primary Examiner* — Paul R. Myers
(74) *Attorney, Agent, or Firm* — Zilka-Kotab, P.C.

(57) ABSTRACT

A universal serial bus (USB) disconnection switch system, method, and computer program product are provided. In use, it is determined that a USB port integrated with a computing device is in electrical communication with at least one hardware component of the computing device via a data bus. Additionally, it is determined that a first predefined condition of the computing device is satisfied. Further, a switch is controlled to disconnect the data bus from the at least one hardware component of the computing device, based on the determination that the USB port is in electrical communication with the at least one hardware component via the data bus and the determination that the first predefined condition of the computing device is satisfied.

17 Claims, 7 Drawing Sheets

(56) References Cited

U.S. PATENT DOCUMENTS

| | | | | |
|---|---|---|---|---|
| 6,138,240 | A * | 10/2000 | Tran | G06F 21/82 726/19 |
| 6,205,502 | B1 * | 3/2001 | Endo | G06F 13/4068 710/100 |
| 6,415,342 | B1 * | 7/2002 | Wahl | G06F 13/4072 710/100 |
| 6,463,540 | B1 * | 10/2002 | Lelong | G06F 21/57 710/107 |
| 6,625,738 | B1 * | 9/2003 | Shiga | G06F 1/3215 710/67 |
| 6,647,452 | B1 * | 11/2003 | Sonoda | G06F 13/4291 710/15 |
| 6,912,663 | B1 * | 6/2005 | Dayan | G06F 13/4295 361/679.08 |
| 7,134,027 | B2 * | 11/2006 | Calhoon | G06F 1/26 713/300 |
| 7,725,731 | B2 * | 5/2010 | Brown | G06F 21/85 713/183 |
| 7,747,807 | B2 * | 6/2010 | Komatsu | G06F 1/3203 710/15 |
| 7,827,600 | B2 * | 11/2010 | Okimura | B41J 29/393 726/20 |
| 8,432,835 | B1 * | 4/2013 | Dirks | H04Q 11/0428 348/14.08 |
| 8,799,539 | B2 * | 8/2014 | Lambert | G06F 13/4072 710/62 |
| 8,984,653 | B2 * | 3/2015 | John | G06F 21/88 726/26 |
| 9,356,925 | B2 * | 5/2016 | Alrabady | H04L 63/107 |
| 9,574,671 | B1 * | 2/2017 | Amberg | H04W 64/00 |
| 9,723,487 | B2 * | 8/2017 | Ramalingam | H04W 12/08 |
| 9,841,490 | B1 * | 12/2017 | Swartz | G01S 5/0252 |
| 9,972,146 | B1 * | 5/2018 | Beard | G07C 9/00563 |
| 2006/0037074 | A1 * | 2/2006 | Yang | G06F 21/85 726/17 |
| 2006/0107008 | A1 * | 5/2006 | Ghanem | G06F 12/1408 711/163 |
| 2006/0203736 | A1 * | 9/2006 | Molen | H04L 12/2803 370/245 |
| 2008/0244108 | A1 | 10/2008 | Abramson et al. | |
| 2008/0250165 | A1 | 10/2008 | Reynolds et al. | |
| 2011/0162035 | A1 | 6/2011 | King et al. | |
| 2012/0215839 | A1 * | 8/2012 | Doyle | H04L 67/06 709/203 |
| 2012/0278598 | A1 | 11/2012 | Wang et al. | |
| 2016/0088432 | A1 * | 3/2016 | Myers | H04W 4/02 340/5.2 |
| 2016/0226278 | A1 * | 8/2016 | Wenger | H02J 7/0044 |
| 2016/0314289 | A1 * | 10/2016 | Parikh | G06F 3/0488 |
| 2017/0126389 | A1 * | 5/2017 | Verdino | G06F 13/385 |
| 2017/0315954 | A1 * | 11/2017 | Chung | G06F 13/4282 |
| 2018/0013798 | A1 * | 1/2018 | Pallas | H04L 63/205 |

OTHER PUBLICATIONS

SyncStop, "Charge Safely," 2014, pp. 1-7, retreived from http://syncstop.com/.

* cited by examiner

UNIVERSAL SERIAL BUS (USB) DISCONNECTION SWITCH SYSTEM, COMPUTER PROGRAM PRODUCT, AND METHOD

RELATED APPLICATION(S)

This application claims the benefit of U.S. Provisional Patent Application No. 62/463,504 filed Feb. 24, 2017, the entire contents of which are incorporated herein by reference.

FIELD OF THE INVENTION

The present invention relates to computing devices having an integrated universal serial bus (USB) port, and more particularly to disabling features of a USB port integrated with a computing device.

BACKGROUND

Most computing devices on the market include an integrated universal serial bus (USB) port. For example, many laptop computers, tablets, mobile phones, printers, etc. are manufactured to include at least one USB port as an integrated hardware component. Integration means that the USB port is built into the computing device.

Typically, the USB port remains communicatively connected to other hardware components of the computing device, by virtue of its integration with the computing device. For example, a USB bus connecting the USB port and the other hardware components of the computing device, such as memory, a processor, etc., may enable such constant communication.

However, there may be instances where it is desirable to disable at least some features of the integrated USB port, such as those enabling data transfer to the other hardware components of the computing device, i.e. to prevent data transfer between the USB port and the other hardware components of the computing device. For example, when charging the computing device using a public power source through the USB port, it may be desirable to prevent any data transfer to/from the other hardware components of the computing device via the USB port (e.g. to prevent theft of data on the computing device via the public power source, to prevent installation of malware on the computing device by the public power source, etc.).

To date, the only mechanism for preventing data transfer through a USB port has been a hardware device that is manufactured and sold independently from the computing device. The hardware device has one end that must be plugged into the USB port, and another end for receiving a USB cable that for example is plugged into a charging outlet. The hardware device blocks the data pins on the USB cable and allows only power to flow through. One such hardware device is the SyncStop made by Xipiter LLC.

However, to date there has been no solution integrated within the computing device to control features of the integrated USB port. There is thus a need for addressing these and/or other issues associated with the prior art.

SUMMARY

A universal serial bus (USB) disconnection switch system, method, and computer program product are provided. In use, it is determined that a USB port integrated with a computing device is in electrical communication with at least one hardware component of the computing device via a data bus. Additionally, it is determined that a first predefined condition of the computing device is satisfied. Further, a switch is controlled to disconnect the data bus from the at least one hardware component of the computing device, based on the determination that the USB port is in electrical communication with the at least one hardware component via the data bus and the determination that the first predefined condition of the computing device is satisfied.

DETAILED DESCRIPTION

Figure 1A:
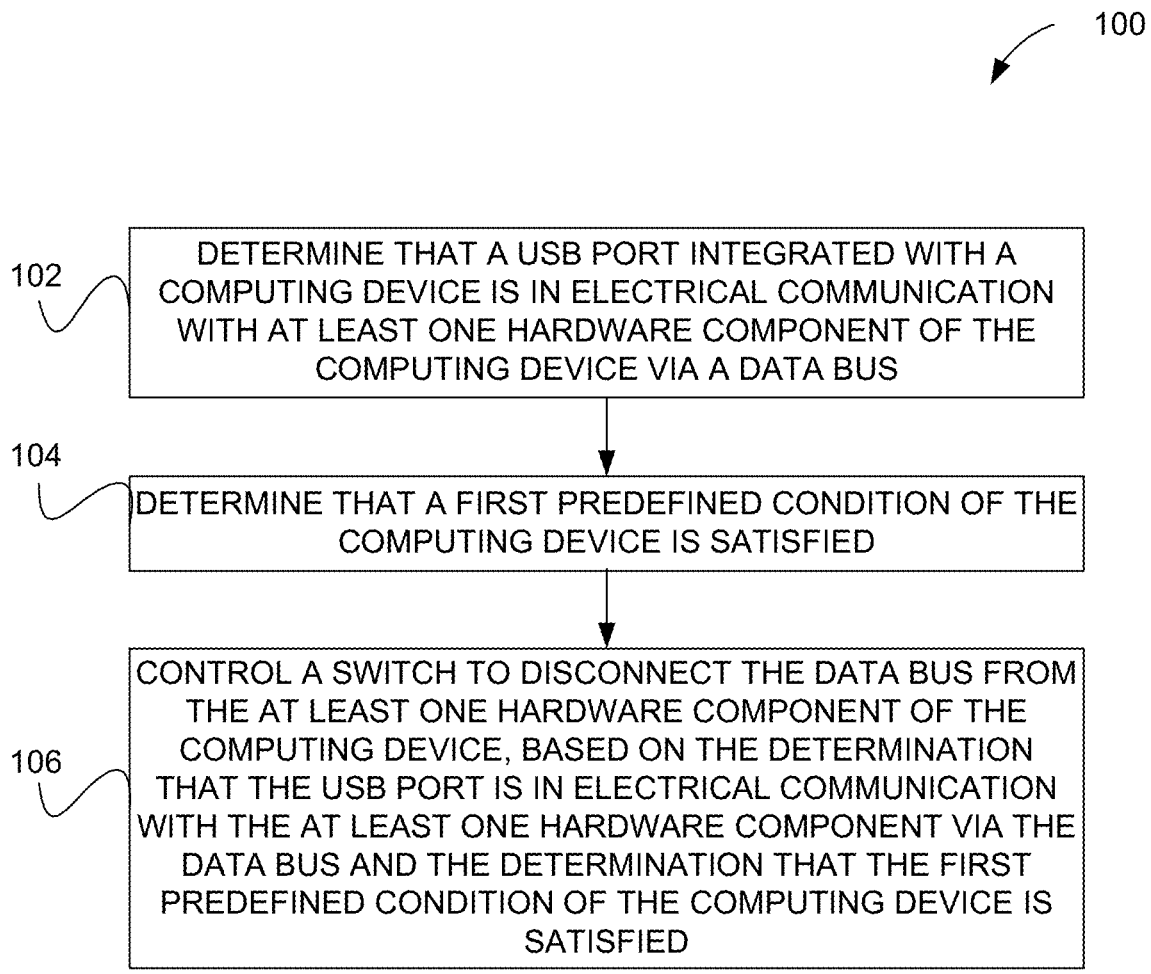
FIG. 1A shows a universal serial bus (USB) disconnection switch method, in accordance with one embodiment.

FIG. 1A shows a universal serial bus (USB) disconnection switch method 100, in accordance with one embodiment. The method 100 may be performed by a processor of a computing device, in one embodiment. For example, the method 100 may be performed by the central processor 602 of FIG. 6 described below.

In operation 102, it is determined that a USB port integrated with a computing device is in electrical communication with at least one hardware component of the computing device via a data bus. The USB port is a connector capable of receiving a USB cable (e.g. female USB connection, etc.), as is well known in the industry. In the context of the present description, the USB port is integrated with the computing device by virtue of the USB port being built into the computing device, such as a housing of the computing device. The computing device may be a laptop computer, desktop computer, or any other device having a USB port integrated therein.

Thus, on one end the USB port may have a slot for receiving a USB cable, and on another end the USB port may be electrically connected to a data bus. This may allow data to transfer to or from the computing device via the USB port and the connected data bus. For example, when a USB cable connected on one end to a data source with the other end inserted into the USB port, data may transfer from the USB cable to the data bus via the USB port. As another example, when a USB cable connected on one end to a data source with the other end inserted into the USB port, data may transfer from the data bus to the USB cable via the USB port. Of course, the USB port may also be used for charging the computing device, as is well known in the art.

As noted above, it is determined that the USB port is in electrical communication with at least one hardware component of the computing device via a data bus. In other words, the USB port is electrically connected to the at least one hardware component of the computing device via the data bus. The hardware component may be the processor of the computing device mentioned above, or another processor of the computing device. In another embodiment, the hardware component may be memory of the computing device. In yet another embodiment, the hardware component may be a system on chip (SoC) of the computing device.

Additionally, in operation 104, it is determined that a first predefined condition of the computing device is satisfied. The first predefined condition may be any condition that has been predefined (e.g. within memory of the computing device). For example, the first predefined condition may be configured as a default setting within the computing device, or as a customized (i.e. user configured) setting within the computing device.

In one embodiment, the first predefined condition may include the computing device being switched off, powered down, etc. (e.g. from an active state to a deactivated state). In another embodiment, the first predefined condition may include the computing device booting up (e.g. from a deactivated state to an active state). In yet another embodiment, the first predefined condition may relate to an identified level of security of the computing device. For example, the first predefined condition may include a location of the computing device being identified as unsecure. As another example, the first predefined condition may include a network connectivity of the computing device (e.g. a network to which the computing device is connected) being identified as unsecure.

Additionally, the first predefined condition may relate to a state of the device. For example, the first predefined condition may include the computing device being connected to an untrusted external device. In one embodiment, a key (e.g. security key, etc.) may be used for purposes of determining whether an external device, location, network, etc. is secure or unsecure. Such key may include a public key, private key, a key combination, a two-step authentication process, etc.

Further, the first predefined condition may also relate to a direct action taken by a user of the computing device. For example, the first predefined condition may be that the user has selected (e.g. via an interface of the computing device) to disable the USB port.

In any case, the first predefined condition may be a trigger, such as for operation 106 described below. In operation 106, a switch is controlled to disconnect the data bus from the at least one hardware component of the computing device, based on the determination that the USB port is in electrical communication with the at least one hardware component via the data bus and the determination that the first predefined condition of the computing device is satisfied. Thus, in operation 102 the switch may be configured in a first state to electrically connect the data bus to the at least one hardware component, such that the USB port is electrically connected via the data bus to the at least one hardware component. However, in operation 106, the switch may be controlled to change configuration to a second state in which the data bus is electrically disconnected from the at least one hardware component.

It should therefore be noted that the switch may be a hardware device, referred to herein below as a USB hardware switch, that can be controlled using computer code to operate in the first state or the second state. To this end, the disconnection may be a physical separation of the data bus from the at least one hardware component and may be effected using the switch.

As noted above, operation 106 may be performed responsive to both operations 102 and 104. Thus, the data bus may only be disconnected from the at least one hardware component in operation 106 when the switch is in the first state mentioned above and when triggered by operation 104. It should be noted that the first predefined condition described in operation 104 may be predefined with the intent to enhance security of the computing device, such as to protect data stored in memory of the computing device from theft via the USB port or to protect the computing device from having malware installed thereon via the USB port, e.g. when the location and/or network connectivity of the computing device is identified as unsecure. Thus, the disconnection may increase security of the computing device, such as security of data located in memory of the computing device.

Of course, the first predefined condition described in operation 104 may be predefined with any other intent as desired. Further, while only one predefined condition is mentioned, it should be noted that this may also include any number of different conditions as desired.

In a further embodiment, charging of the computing device via the USB port may be enabled after the disconnection occurs. For example, the switch may only be controlled to disconnect the data bus, whereas a power bus providing an electrical connection between the USB port and a battery may be maintained. This embodiment is described in further detail below.

Figure 1B:
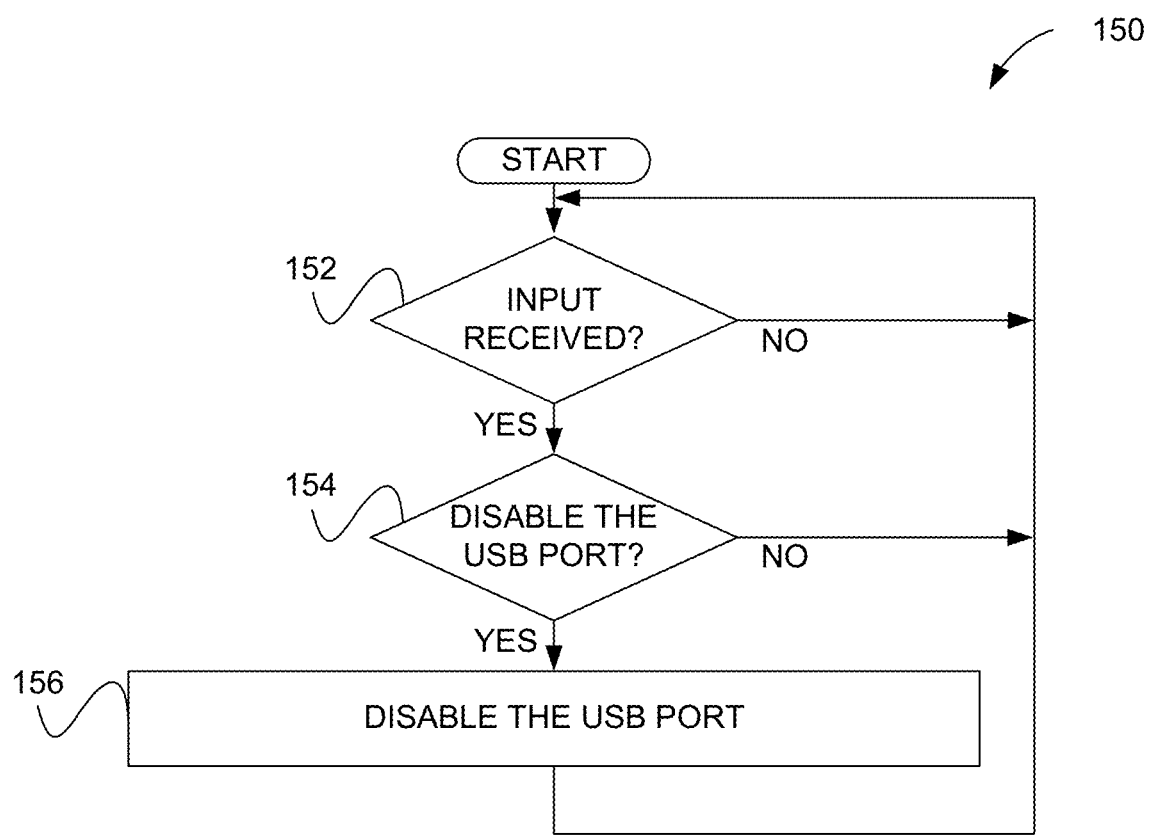
FIG. 1B shows a USB disconnection switch method, in accordance with another embodiment.

FIG. 1B shows a USB disconnection switch method 150, in accordance with another embodiment As an option, the method 150 may be carried out in the context of any one or more of the embodiments set forth in any previous and/or subsequent figure(s) and/or description thereof. For example, the method 150 may be carried out by the processor mentioned above. However, it is to be appreciated that the method 150 may be implemented in the context of any desired environment.

In decision 152, it is determined whether input is received. In the context of the present description, the input may provided by a user to alter a state of the USB hardware switch. In one embodiment, the input may be received via a software interface displayed on a computing device having the USB hardware switch. If it is determined in decision 152 that input is not received, the method 150 continues to wait for the receipt of the input.

As shown, per decision 154, if the input is received, it is determined whether to disable the USB port. Disabling the USB port may include disabling one or more features of the USB port, such as a data transfer capability of the USB port. For example, in the context of the method 100 of FIG. 1A, the USB hardware switch may be in a first state (such as in operation 102) where the data bus is electrically connected to an integrated hardware component, such that the USB port is electrically connected via the data bus to the at least one hardware component. Based on the received input determined in decision 152, it may be determined in decision 154 whether to disable the USB port by configuring the USB hardware switch in a second state in which the data bus is electrically disconnected from the hardware component. For example, if the received input satisfies the first predetermined condition of operation 104 of FIG. 1A, then it may be determined to disable the USB port.

For example, the input may be to cause a near immediate effect, including activating the USB hardware switch to physically then disconnect the data bus used by the USB port from the hardware component (e.g. SoC, etc.). In an alternative embodiment, an input may have a time component associated with the input. For example, the input may be received by the user to disable the USB port after a specified time delay (e.g. to implement such disconnection in ten minutes).

In one embodiment, the input may include a context-aware aspect, including location, proximity to other devices, etc. For example, the input may include disabling the USB port until a context-aware condition (e.g. device is no longer at a specified location, etc.) is triggered.

If it is determined in decision 154 not to disable the USB port, then the method returns to decision 152. If, however, it is determined per decision 154 to disable the USB port, then in operation 156 the USB port is disabled (e.g. by configuring the USB hardware switch in a second state in which the data bus is electrically disconnected from the hardware component). After disabling the USB port, the method 150 then monitors, per decision 152, to determine if any further input is received to alter the state of the USB hardware switch (e.g. to electrically connect the data bus to the hardware component immediately, with time delay, etc.).

As such, direct user input (e.g. obtained through a software interface) may control the USB hardware switch associated with the USB port, where such control may directly influence whether one or more features of the USB port are enabled or disabled.

More illustrative information will now be set forth regarding various optional architectures and uses in which the foregoing method may or may not be implemented, per the desires of the user. It should be noted that the following information is set forth for illustrative purposes and should not be construed as limiting in any manner. Any of the following features may be optionally incorporated with or without the exclusion of other features described.

Figure 2:
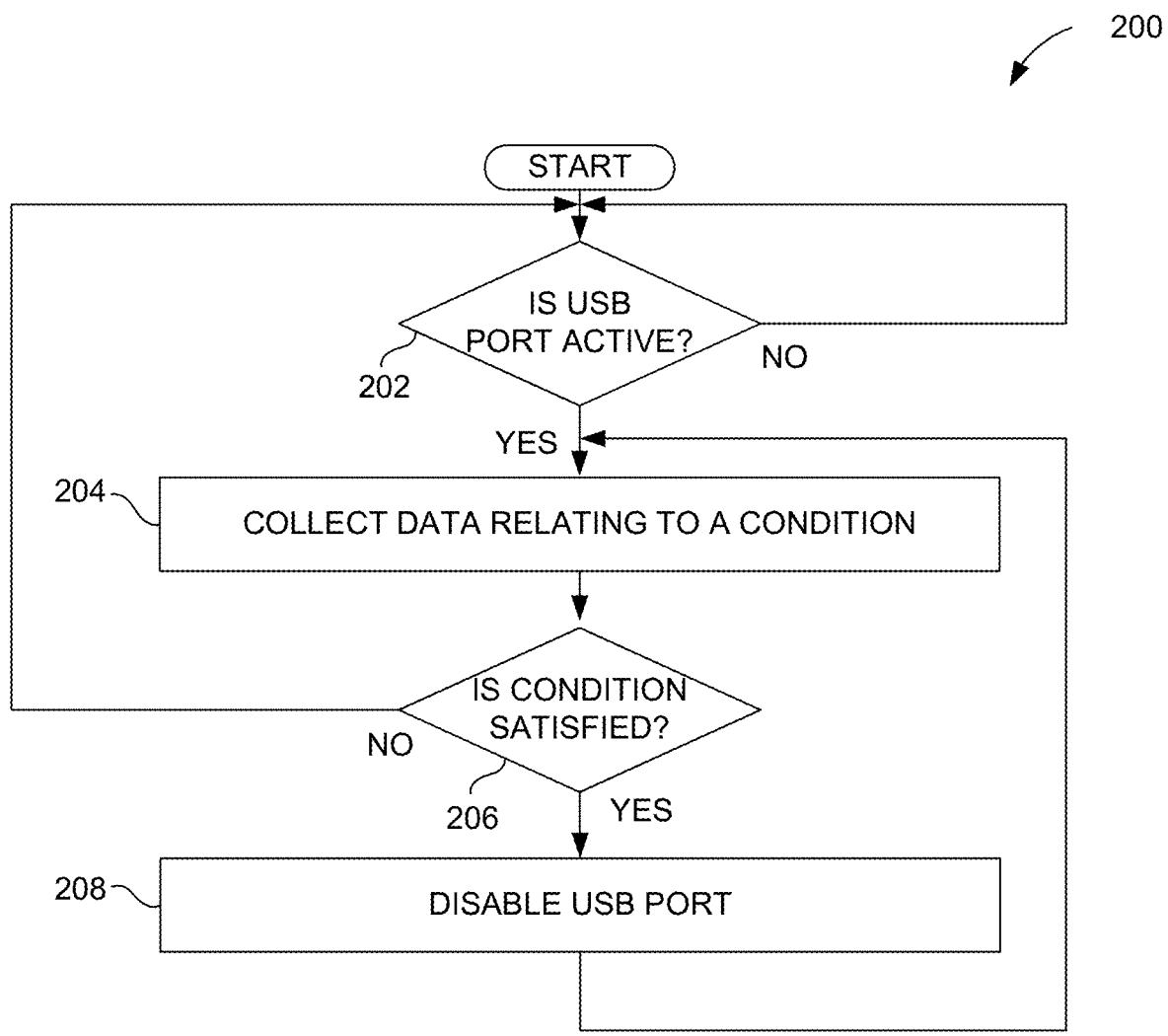
FIG. 2 shows a USB disconnection switch method, in accordance with yet another embodiment.

FIG. 2 illustrates a USB disconnection switch method 200, in accordance with one embodiment. As an option, the method 200 may be carried out in the context of any one or more of the embodiments set forth in any previous and/or subsequent figure(s) and/or description thereof. However, it is to be appreciated that the method 200 may be carried out in the context of any desired environment.

As shown, method 200 includes determining, in decision 202, if the USB port is active. In the context of the present embodiment, the USB port is active when a data transfer feature of the USB port is enabled (i.e. by virtue of the data bus being in electrical communication with an integrated hardware component). If it is determined in decision 202 that the USB port is not active (i.e. the data bus is disconnected from the integrated hardware component), the method 200 waits until the USB port is active.

If it is determined in decision 202 that the USB port is active, then in operation 202, data is collected relating to a condition. Of course, it is to be appreciated that the condition may include a rule (e.g. if USB port is active then it should be disabled by default, etc.), a state of the device (e.g. if the USB port is connected to an external device then disable the USB port, etc.), a location (e.g. unsecure location such as airport, etc.), a network connectivity (e.g. unsecure network connection, etc.), proximity to another device (e.g. trusted device, smart watch, etc.), and/or any other information which influence whether the USB port should be disabled.

Per decision 206, it is determined whether the condition is satisfied. In one embodiment, satisfying the condition may include a positive response (e.g. condition is fulfilled). For example, a location which is unsecure may trigger a condition being satisfied. Further, such conditions may be set manually (e.g. inputted by a user of the computing device, etc.), and/or in advance (e.g. computing device comes with default conditions that influence when the USB port is disabled, etc.). In one embodiment, the condition may be triggered based on a setting of the computing device. For example, if the user selected a higher privacy setting on the computing device, such may automatically activate a set of corresponding conditions, including lowering the threshold for disabling the USB port. As such, the conditions may be edited, controlled, and configured via the computing device, via another device (e.g. trusted device, etc.) over a network (e.g. server based rule system, component update, software update, etc.), by a user, or by any other entity or user associated with the computing device.

If it is determined in decision 206 that the condition is not satisfied, the method 200 returns to decision 202. If it is determined in decision 206 that the condition is satisfied, then per operation 208, the USB port is disabled. In one embodiment, the USB portion may be disabled by only disabling a data transfer capability of the USB port, as described above. In this embodiment, a power transfer capability of the USB portion may remain enabled.

Figure 3:
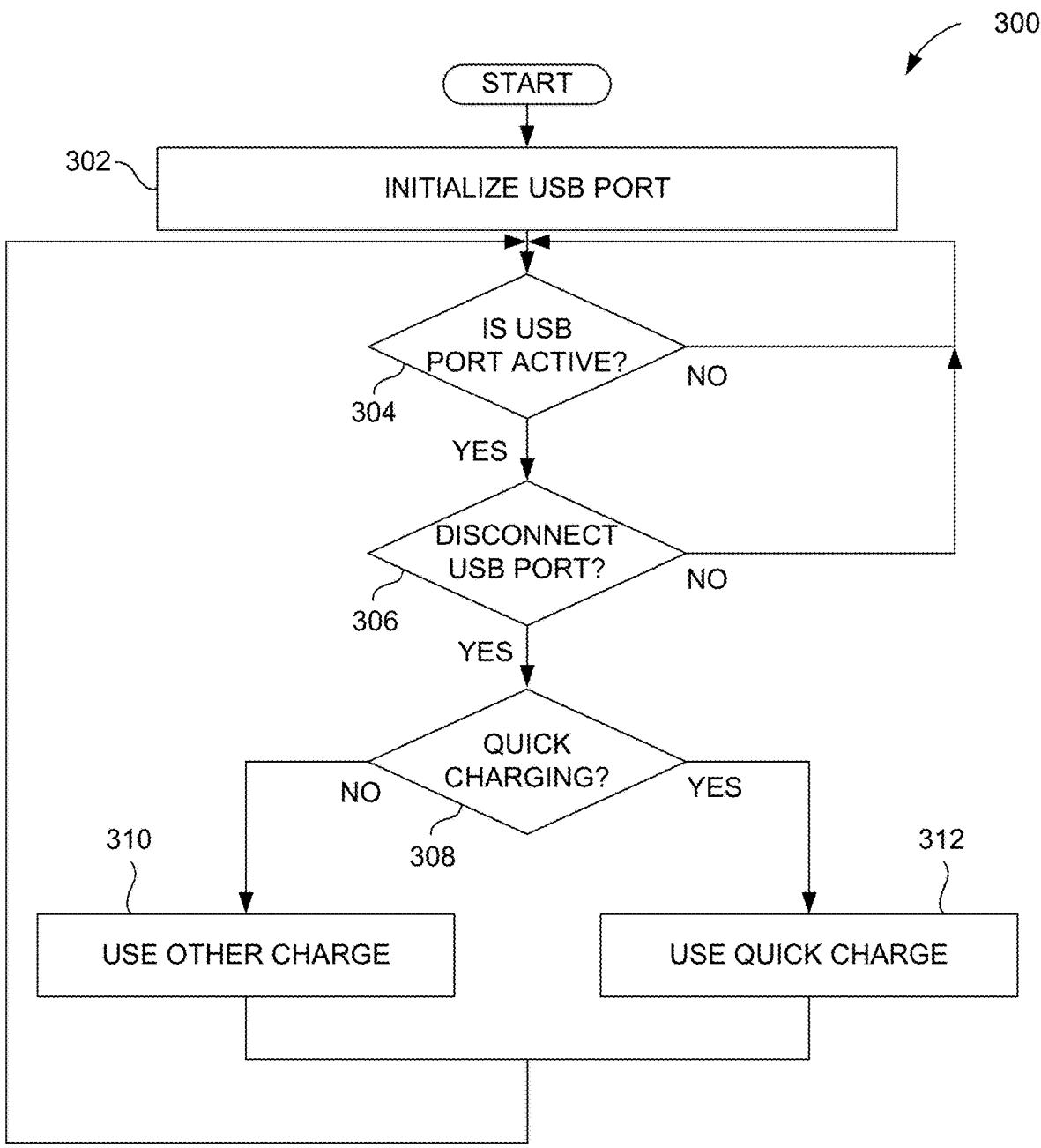
FIG. 3 shows a USB disconnection switch method with enabled USB-based charging, in accordance with still yet another embodiment.

FIG. 3 shows a USB disconnection switch method with enabled USB-based charging 300, in accordance with one embodiment. As an option, the method 300 may be carried out in the context of any one or more of the embodiments set forth in any previous and/or subsequent figure(s) and/or description thereof. However, it is to be appreciated that the method 300 may be carried out in the context of any desired environment.

As shown, a USB port is initialized. See operation 302. Next, in decision 304, it is determined if the USB port is active. If not, the method 300 waits until the USB port is active. If the USB port is determined in decision 304 to be active, then in decision 306 it is determined if the USB port should be disabled. In use, decision 306 may inherently include operation 204, decision 206, and operation 208 as described previously.

If it is determined that the USB port is to be disabled, it is then determined if quick charging is feasible. See decision 308. For example, a battery charging integrated circuit (e.g. Qualcomm SMB1350, Qualcomm SMB1351, Qualcomm quick charging, USB Type-C fast charging, USB BC1.2 charging, etc.) may enable quick charging of the computing device while the USB port is disabled (e.g. by virtue of the disconnection of the data bus to an integrated hardware component). In use, therefore, per operation 312, if quick charging is feasible, then quick charging is implemented and applied.

In another embodiment, the battery charging integrated circuit used within the computing device may not be capable of simultaneous powering of the USB port while the USB is disabled (i.e. disconnected from a processor). In such an example, it may be determined via decision 308 that quick charging is not feasible, which may lead to operation 310 where another charge solution is used. Such other charge solution may include use of Type-C charging (not quick charging) and/or legacy charging systems (i.e. slow charging, etc.).

Figure 4:
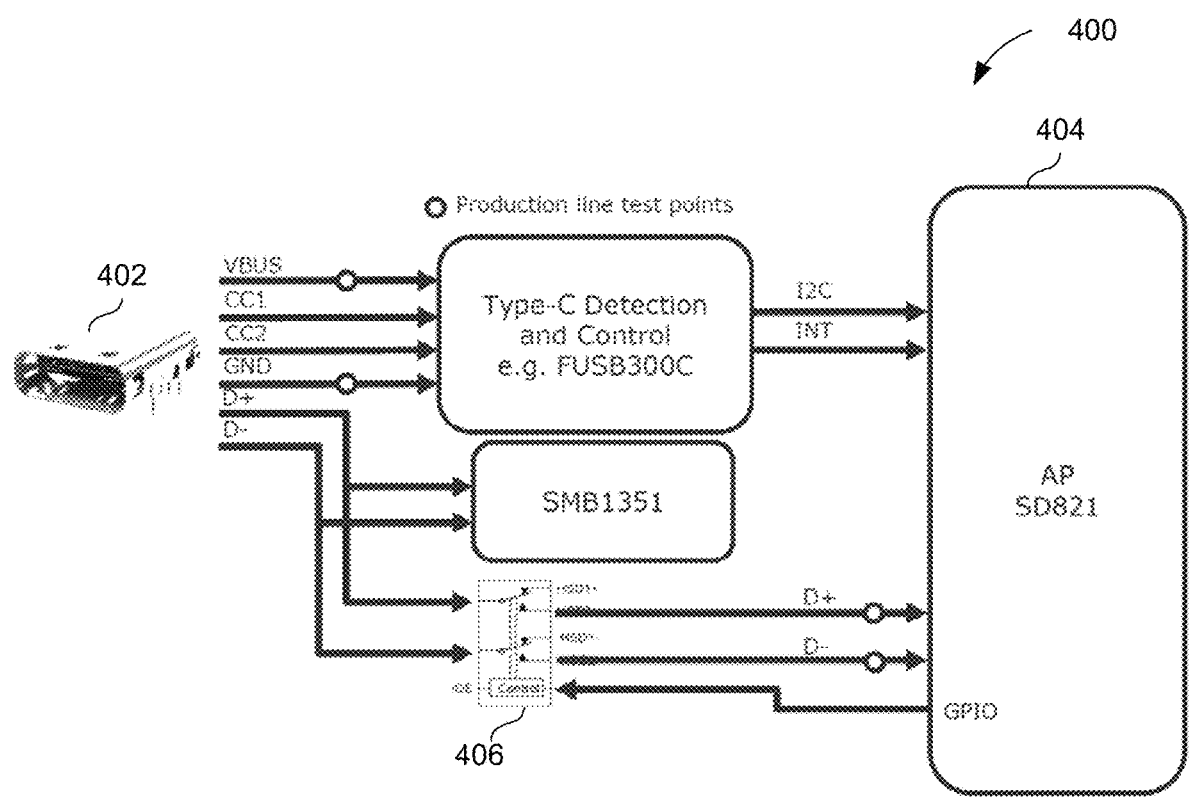
FIG. 4 shows a USB disconnection switch system, in accordance with yet another embodiment.

FIG. 4 illustrates shows a USB disconnection switch system 400, in accordance with one embodiment. As an option, the system 400 may be implemented in the context of any one or more of the embodiments set forth in any previous and/or subsequent figure(s) and/or description thereof. For example, the system 400 may be implemented in the computing device described above. However, it is to be appreciated that the system 400 may be implemented in the context of any desired environment.

As shown, a USB port 402 is connected to a processor 404 (e.g. AP SD821, etc.). Several circuit lines connect the USB port 402 to the processor 404, including VBUS (e.g. USB supply voltage, etc.), CC1 (e.g. USB Type-C Configuration channel 1, etc.), CC2 (e.g. USB Type-C Configuration channel 2, etc.), GND (e.g. signal ground potential, tec.), D+(e.g. USB data bus positive part of the differential signal, etc.) and D− (e.g. USB data bus negative part of the differential signal, etc.). Additionally, charging integrated circuits (e.g. SMB1351, Type-C Detection and Control, etc.) are used to assist with charging, with some functionality continuing even if the USB port 402 is disconnected from the processor 404, as herein described in relation to the figures above. Further, a USB hardware switch 406 is shown including USB inputs (e.g. D+ and D−, etc.), USB output number 1 (e.g. HSD1+, HSD1−, etc.), USB output number 2 (e.g. HSD2+, HSD2−, etc.), and high speed (HS). In use, the USB hardware switch 406 may be used to disconnect the USB port 402 from the processor 404.

Additionally, although not shown in system 400, a data bus (e.g. I2C, etc.) would extend from the USB integrated circuit (e.g. SMB1351, etc.) and the processor 404. In this manner, the USB signals flow to the USB integrated circuit (e.g. SMB1351, etc.), and then to the data bus (e.g. I2C, etc.) and then to the processor 404. In like manner, data flow from the processor 404 to the USB port 402 would also use the data bus (e.g. I2C, etc.).

In one embodiment, disconnecting the USB port 402 from the processor 404 may assist in prevent accidental data exchange. Such a system may be used to prevent stealing of data and/or installation of malware on the computing device. In use, such a system 400 may be used to prevent data transferred in association with an external device. Additionally, the need to disconnect a USB port 402 from a processor 404 may arise in any location where privacy and/or security needs to be maintained. For example, the computing device accessing an unsecure network (e.g. in an airport, etc.) may have need to secure the data stored therein and/or the computing device itself.

Figure 5:
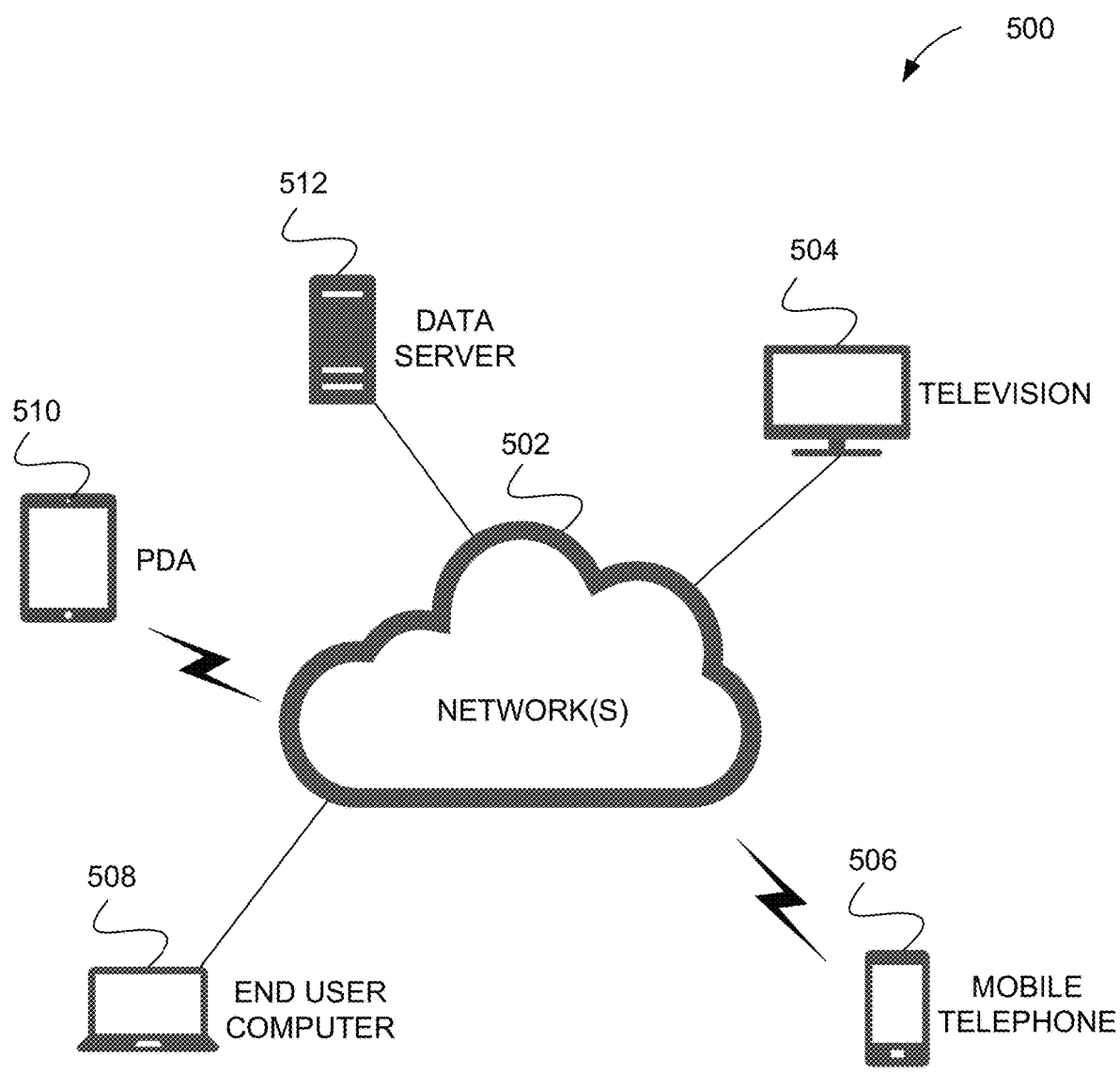
FIG. 5 illustrates a network architecture, in accordance with one embodiment.

FIG. 5 illustrates a network architecture 500, in accordance with one embodiment. As shown, at least one network 502 is provided. In the context of the present network architecture 500, the network 502 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 502 may be provided.

Coupled to the network 502 is a plurality of devices. For example, a server computer 512 and an end user computer 508 may be coupled to the network 502 for communication purposes. Such end user computer 508 may include a desktop computer, lap-top computer, and/or any other type of logic. Still yet, various other devices may be coupled to the network 502 including a personal digital assistant (PDA) device 510, a mobile phone device 506, a television 504, etc.

Figure 6:
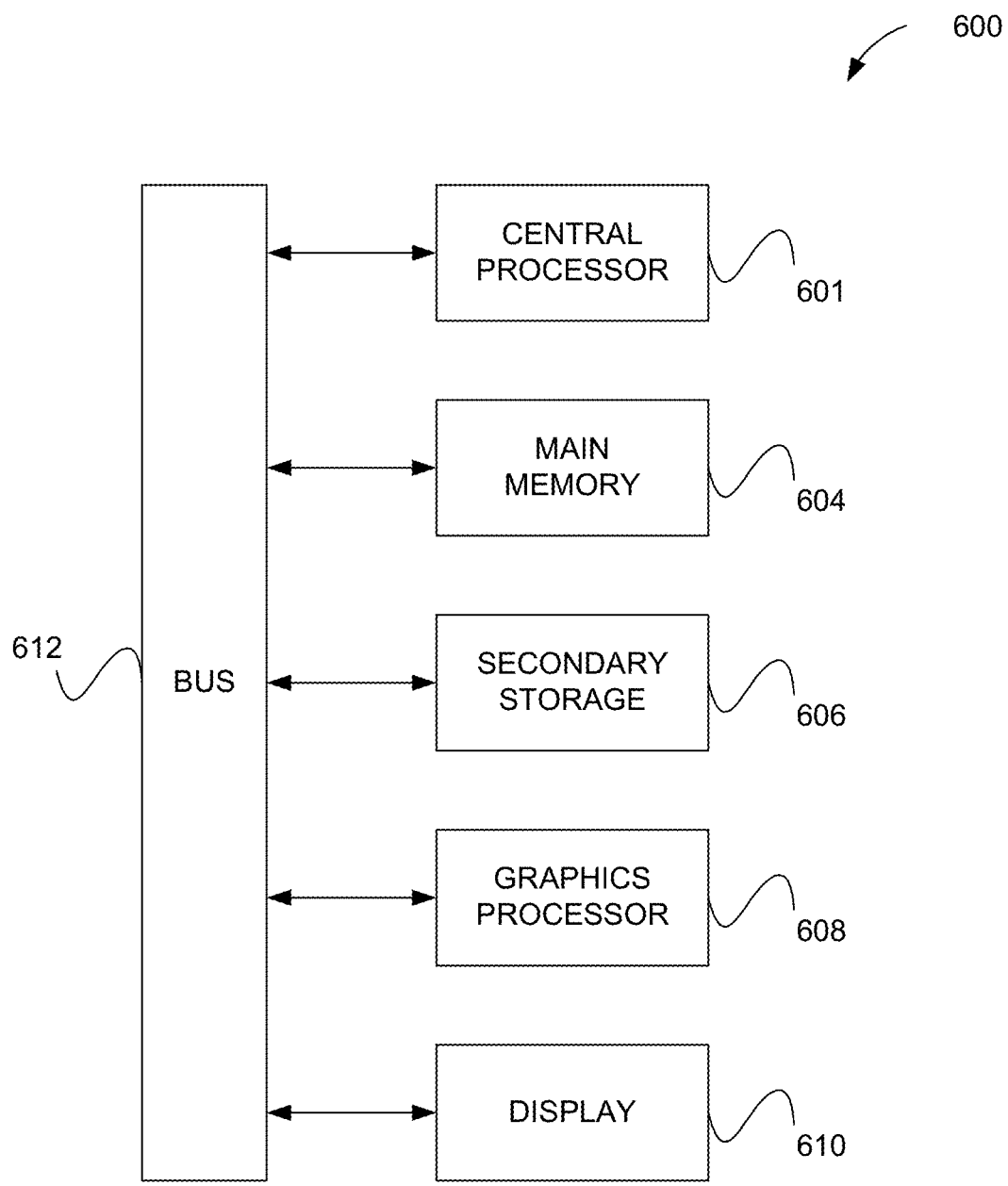
FIG. 6 illustrates an exemplary system, in accordance with one embodiment.

FIG. 6 illustrates an exemplary system 600, in accordance with one embodiment. As an option, the system 600 may be implemented in the context of any of the devices of the network architecture 500 of FIG. 5. However, it is to be appreciated that the system 600 may be implemented in any desired environment.

As shown, a system 600 is provided including at least one central processor 602 which is connected to a bus 612. The system 600 also includes main memory 604 [e.g., hard disk drive, solid state drive, random access memory (RAM), etc.]. The system 600 also includes a graphics processor 608 and a display 610.

The system 600 may also include a secondary storage 606. The secondary storage 606 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 604, the secondary storage 606, and/or any other memory, for that matter. Such computer programs, when executed, enable the system 600 to perform various functions (as set forth above, for example). Memory 604, secondary storage 606 and/or any other storage are possible examples of non-transitory computer-readable media.

In one embodiment, means in the form of the processor 602 (and/or different means corresponding to different components thereof) executes instructions in the memory 604 or in the secondary storage 606 to: determine that a USB port integrated with a computing device is in electrical communication with at least one hardware component of the computing device via a data bus; determine that a first predefined condition of the computing device is satisfied; and control a switch to disconnect the data bus from the at least one hardware component of the computing device, based on the determination that the USB port is in electrical communication with the at least one hardware component via the data bus and the determination that the first predefined condition of the computing device is satisfied.

Optionally, in any of the preceding embodiments, the first predefined condition includes the computing device being switched off or the computing device booting up.

Optionally, in any of the preceding embodiments, the first predefined condition is configured as a default setting within the computing device.

Optionally, in any of the preceding embodiments, the first predefined condition is configured as a customized setting within the computing device.

Optionally, in any of the preceding embodiments, the first predefined condition is a trigger Optionally, in any of the preceding embodiments, the first predefined condition includes a location of the computing device being identified as unsecure.

Optionally, in any of the preceding embodiments, the first predefined condition includes a network connectivity of the computing device being identified as unsecure.

Optionally, in any of the preceding embodiments, the disconnection is a physical separation of the data bus from the at least one hardware component.

Optionally, in any of the preceding embodiments, the at least one hardware component of the computing device is the processor.

Optionally, in any of the preceding embodiments, the at least one hardware component of the computing device is memory.

Optionally, in any of the preceding embodiments, charging of the computing device via the USB port is enabled after the disconnection occurs.

Optionally, in any of the preceding embodiments, the disconnection increases security of the computing device.

Optionally, in any of the preceding embodiments, the disconnection increases security of the computing device.

Optionally, in any of the preceding embodiments, the disconnection increases security of data located in memory of the computing device.

It is noted that the techniques described herein, in an aspect, are embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media are included which may store data that is accessible by a computer, such as magnetic cassettes, flash memory cards, digital video disks, Bernoulli cartridges, random access memory (RAM), read-only memory (ROM), and the like.

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that various of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein include the one or more modes known to the inventor for carrying out the claimed subject matter. It is to be appreciated that variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A computer program product comprising computer executable instructions stored on a non-transitory computer readable medium that when executed by a processor instruct the processor to:
 determine that a USB port integrated with a computing device is in electrical communication with at least one hardware component of the computing device via a data bus;
 access a setting within the computing device indicating a first predefined condition of the computing device for causing a switch to physically disconnect the data bus from the at least one hardware component of the computing device;
 determine that the first predefined condition of the computing device is satisfied, the first predefined condition including at least one of:
  the computing device being connected to an untrusted external device, or
  a network to which the computing device is connected being identified as unsecure; and
 control the switch to physically disconnect the data bus from the at least one hardware component of the computing device, responsive to the determination that the USB port is in electrical communication with the at least one hardware component via the data bus and the determination that the first predefined condition of the computing device is satisfied.

2. The computer program product of claim 1, wherein the first predefined condition is configured as a default setting within the computing device.

3. The computer program product of claim 1, wherein the first predefined condition is configured as a customized setting within the computing device.

4. The computer program product of claim 1, wherein the first predefined condition is a trigger.

5. The computer program product of claim 1, wherein the physical disconnection is a physical separation of the data bus from the at least one hardware component.

6. The computer program product of claim 1, wherein the at least one hardware component of the computing device is the processor.

7. The computer program product of claim 1, wherein the at least one hardware component of the computing device is memory.

8. The computer program product of claim 1, wherein charging of the computing device via the USB port is enabled after the physical disconnection occurs.

9. The computer program product of claim 1, wherein the physical disconnection increases security of the computing device.

10. The computer program product of claim 1, wherein the physical disconnection increases security of data located in memory of the computing device.

11. A method, comprising:
 determining that a USB port integrated with a computing device is in electrical communication with at least one hardware component of the computing device via a data bus;
 accessing a setting within the computing device indicating a first predefined condition of the computing device for causing a switch to physically disconnect the data bus from the at least one hardware component of the computing device;
 determining that the first predefined condition of the computing device is satisfied, the first predefined condition including at least one of:
  the computing device being connected to an untrusted external device, or
  a network to which the computing device is connected being identified as unsecure; and
 controlling the switch to physically disconnect the data bus from the at least one hardware component of the computing device, responsive to the determination that the USB port is in electrical communication with the at least one hardware component via the data bus and the determination that the first predefined condition of the computing device is satisfied.

12. A computing device, comprising:
 a USB port;
 a data bus;
 at least one hardware component;
 a switch coupled between the data bus and the at least one hardware component; and
 a processor configured to:
 determine that the USB port is in electrical communication with the at least one hardware component of the computing device via the data bus,
 access a setting within the computing device indicating a first predefined condition of the computing device for causing the switch to physically disconnect the data bus from the at least one hardware component of the computing device,
 determine that the first predefined condition of the computing device is satisfied, the first predefined condition including at least one of:
  the computing device being connected to an untrusted external device, or
  a network to which the computing device is connected being identified as unsecure; and
 control the switch to physically disconnect the data bus from the at least one hardware component, responsive to the determination that the USB port is in electrical communication with the at least one hardware component via the data bus and the determination that the first predefined condition of the computing device is satisfied.

13. The computing device of claim 12, wherein the at least one hardware component is the processor.

14. The computing device of claim 12, further comprising memory, and wherein the first predefined condition is stored as a setting in the memory.

15. The computing device of claim 14, wherein the at least one hardware component is the memory.

16. The computing device of claim 12, wherein the physical disconnection is a physical separation of the data bus from the at least one hardware component.

17. The computing device of claim 12, wherein charging of the computing device via the USB port is enabled after the physical disconnection occurs.

* * * * *